(12) United States Patent
Aldridge et al.

(10) Patent No.: US 7,992,201 B2
(45) Date of Patent: Aug. 2, 2011

(54) DYNAMIC NETWORK TUNNEL ENDPOINT SELECTION

(75) Inventors: M. Lynn Aldridge, Bonners Ferry, ID (US); Peter C. Dill, Raleigh, NC (US); Ivan M. Heninger, Selma, NC (US); John D. Kari, Coeur d'Alene, ID (US); Clifford D. Marano, Middlebury, CT (US); David M. Urgo, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1001 days.

(21) Appl. No.: 11/828,756

(22) Filed: Jul. 26, 2007

(65) Prior Publication Data

US 2009/0031415 A1 Jan. 29, 2009

(51) Int. Cl.
*G06F 17/00* (2006.01)
(52) U.S. Cl. ............... 726/15; 726/14; 726/11
(58) Field of Classification Search ......... 726/15, 726/14, 11
See application file for complete search history.

(56) References Cited

U.S. PATENT DOCUMENTS

| | | | |
|---|---|---|---|
| 6,075,783 A | 6/2000 | Voit | |
| 6,456,617 B1 | 9/2002 | Oda et al. | |
| 6,483,600 B1 | 11/2002 | Schuster et al. | |
| 6,600,738 B1 | 7/2003 | Alperovich et al. | |
| 6,804,224 B1 | 10/2004 | Schuster et al. | |
| 2002/0026515 A1 | 2/2002 | Michielsens et al. | |
| 2002/0032799 A1 | 3/2002 | Wiedeman et al. | |
| 2002/0141386 A1 | 10/2002 | Minert et al. | |
| 2002/0188678 A1 | 12/2002 | Edecker et al. | |
| 2003/0091028 A1 | 5/2003 | Chang et al. | |

OTHER PUBLICATIONS

Cisco, Enhanced Interior Gateway Routing Protocol, Updated: Sep. 9, 2005.*
VPN (EIGRP MPLS VPN PE-CE Site of Origin (SoO) First Published:12.0(27)S Last Updated: Feb. 28, 2006.*
Dial-to-Connect VPN System for Remote DLNA Communication; Haruyama, T.; Mizuno, S.; Kawashima, M.; Mizuno, O.; Consumer Communications and Networking Conference, 2008. CCNC 2008. 5th IEEE; Publication Year: 2008 , pp. 1224-1225.*
SSL/TLS-based Secure Tunnel Gateway System Design and Implementation; Jianhua Chen; Fang Miao; Quanhai Wang; Anti-counterfeiting, Security, Identification, 2007 IEEE International Workshop on; Publication Year: 2007 , pp. 258-261.*
Detecting HTTP Tunnels with Statistical Mechanisms, all pages of this article; Crotti, M.; Dusi, M.; Gringoli, F.; Salgarelli, L.; Communications, 2007. ICC '07. IEEE International Conference on; year 2007.*

* cited by examiner

*Primary Examiner* — David Y Jung
(74) *Attorney, Agent, or Firm* — Marcia L. Doubet

(57) ABSTRACT

Dynamically selecting an endpoint for a tunnel into an enterprise computing infrastructure. A client dynamically selects a gateway (which may alternatively be referred to as a boundary device or server) as a tunnel endpoint for connecting over a public network (or, more generally, an untrusted network) into an enterprise computing infrastructure. The selection is made, in preferred embodiments, according to least-cost routing metrics pertaining to paths through the enterprise network from the selected gateway to a destination host. The least-cost routing metrics may be computed using factors such as the proximity of selectable tunnel endpoints to the destination host; stability or redundancy of network resources for this gateway; monetary costs of transmitting data over a path between the selectable tunnel endpoints and destination host; congestion on that path; hop count for that path; and/or latency or transmit time for data on that path.

16 Claims, 12 Drawing Sheets

FIG. 5

| Destination Filter /501 | VPN Gateway 9.9.8.8 Cost /502 | VPN Gateway 8.8.7.7 Cost /503 | VPN Gateway 7.7.6.6 Cost /504 |
|---|---|---|---|
| 1.2.3.4 port 24 — 510 | 1 | 2 | 3 |
| 2.3.4.5 — 511 | 1 | 1 | 1 |
| 3.4.5.6 port 21 — 512 | 1 | 3 | 3 |
| 3.4.5.6 port 80 — 513 | 1 | 1 | 1 |

| Destination Filter | Preferred VPN Gateway |
|---|---|
| 1.2.3.4 port 24 | 9.9.8.8 |
| 2.3.4.5 | 9.9.8.8, 8.8.7.7, 7.7.6.6 |
| 3.4.5.6 port 21 | 9.9.8.8 |
| 3.4.5.6 port 80 | 9.9.8.8, 8.8.7.7, 7.7.6.6 |

| | | |
|---|---|---|
| 701 DestinationFilter | VARCHAR | /* destination filter */ |
| 702 VPNServer | VARCHAR | /* info required for VPN client to connect to this server */ |
| 703 Cost | SMALLINT | /* cost associated with using this tunnel endpoint */ |
| 704 Timestamp | DATE | /* time this record was created; used to purge stale records */ |
| 705 ExpirationDate | DATE | /* date this record expires */ |
| 706 PushToClient | BOOLEAN | /* push data to VPN client at log-in time, yes/no */ |

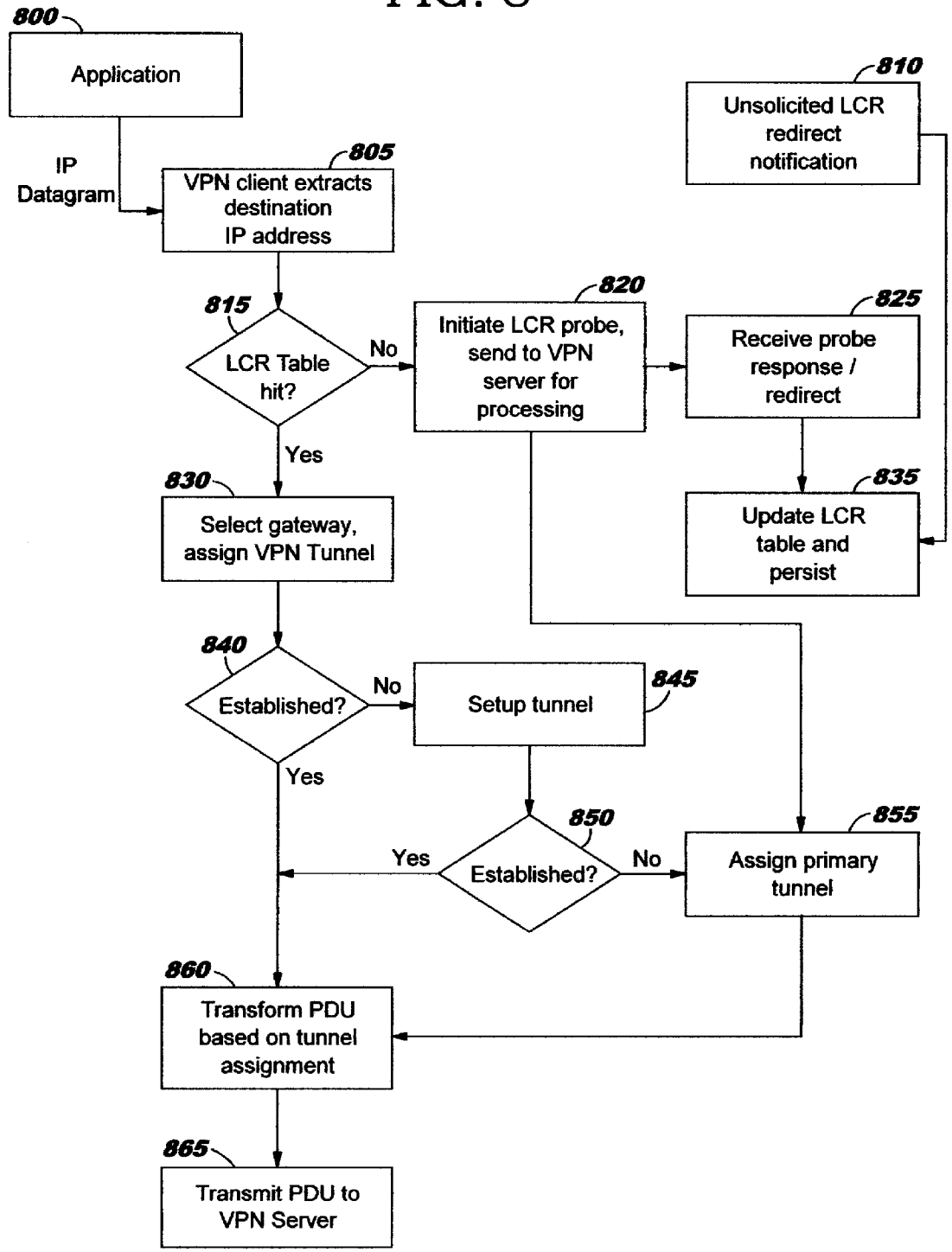

1000

[LCP [CI [table_entry][table_entry][...] ] ]

<1.2.3.4:24><9.9.8.8:34567><1><GMT encoding><GMT encoding><1>

FIG. 12

[LCP [CI [destination_address][destination_port] ] ]

1301 protocol identifier         /* e.g., hex C021 */

1302 content identifier

1303 length

1304 destination filter

1305 VPN tunnel info

1306 cost

1307 timestamp

1308 expiration date

DYNAMIC NETWORK TUNNEL ENDPOINT SELECTION

BACKGROUND OF THE INVENTION

The present invention relates to computer networks, and deals more particularly with dynamically selecting a tunnel endpoint for connecting to an enterprise computing infrastructure.

An enterprise may provide applications that are accessible to users whose computing devices connect to the enterprise computing infrastructure over a public network, such as the public Internet. Public networks are generally considered to be inherently unsecure. To provide a measure of security for data transmitted over the public network to and from such enterprise applications, a virtual private network (commonly referred to as a "VPN") is often used. A client application operating on a user's computing device typically connects to a server application on a boundary device (such as a firewall, router, or other security gateway) located in the enterprise computing infrastructure, where this boundary device logically separates the unsecured public network from security-sensitive computing resources of the enterprise. The connection between the client application and the boundary device is commonly referred to as a "tunnel" or "VPN tunnel", and the boundary device may be referred to (inter alia) as a "VPN gateway", "VPN endpoint", "VPN server", or "tunnel endpoint".

BRIEF SUMMARY OF THE INVENTION

The present invention is directed to selecting a network tunnel endpoint using least-cost routing. In one embodiment, this comprises: a computer-implemented method that dynamically selects, from among a plurality of selectable tunnel endpoints, a particular one of the selectable tunnel endpoints for tunneling into an enterprise network, wherein the particular one has a lowest cost according to cost metric information associated with reaching a destination in the enterprise network from each of the selectable tunnel endpoints; and establishes the network tunnel using the particular one of the selectable tunnel endpoints.

In this embodiment, the cost metric information may comprise at least one of: proximity of the selectable tunnel endpoints to the destination; stability or redundancy of network resources associated with the selectable tunnel endpoints; monetary costs of transmitting data over a path between the selectable tunnel endpoints and the destination; congestion on the path; hop count for the path; and transmit time for data on the path. In addition, each of the selectable tunnel endpoints in this embodiment may be identified using a destination filter, the destination filter for each of the selectable tunnel endpoints comprising at least one of: an identification of the destination address; a source port number associated with an application that will use the tunnel; a destination port number associated with the application; and a destination subnet. The dynamically selecting may further comprise comparing an identification of the destination to the destination filter for selected ones of the selectable tunnel endpoints until determining that the destination filter for the particular one of the selectable tunnel endpoints applies to the identified destination.

In another embodiment, the present invention further comprises: performing the dynamically selecting for each of a plurality of destinations in the enterprise network, thereby selecting at least two different ones of the selectable tunnel endpoints for tunneling into the enterprise network from a client outside the enterprise network; and performing the establishing, by the client, for each of the at least two different ones of the selectable tunnel endpoints, thereby enabling the client to communicate with each of the plurality of destinations using distinct network tunnels from the client to each of the at least two different ones.

Embodiments of these and other aspects of the present invention may also, or alternatively, be provided as systems or computer program products. It should be noted that the foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined by the appended claims, will become apparent in the non-limiting detailed description set forth below.

The present invention will be described with reference to the following drawings, in which like reference numbers denote the same element throughout.

BRIEF DESCRIPTION OF THE SEVERAL VIEWS OF THE DRAWINGS

FIG. 5 shows a sample version of a least-cost routing ("LCR") table that may be used in preferred embodiments, and FIG. 6 illustrates a sample version of an LCR mapping that may be used as one alternative;

FIG. 7 provides a sample data structure format and illustrates one manner of representing the information used for creating the LCR table of FIG. 5 or the LCR mapping of FIG. 6;

FIG. 8 provides a flowchart depicting logic which may be used at a VPN client, according to one embodiment of the present invention, and FIG. 9 expands upon a portion thereof;

FIG. 12 shows a sample message format that may be used for sending an LCR probe request from a VPN client, and FIG. 13 illustrates a sample data structure format 1300 that may be used for redirect notifications that pertain to LCR data;

DETAILED DESCRIPTION OF THE INVENTION

Figure 1:
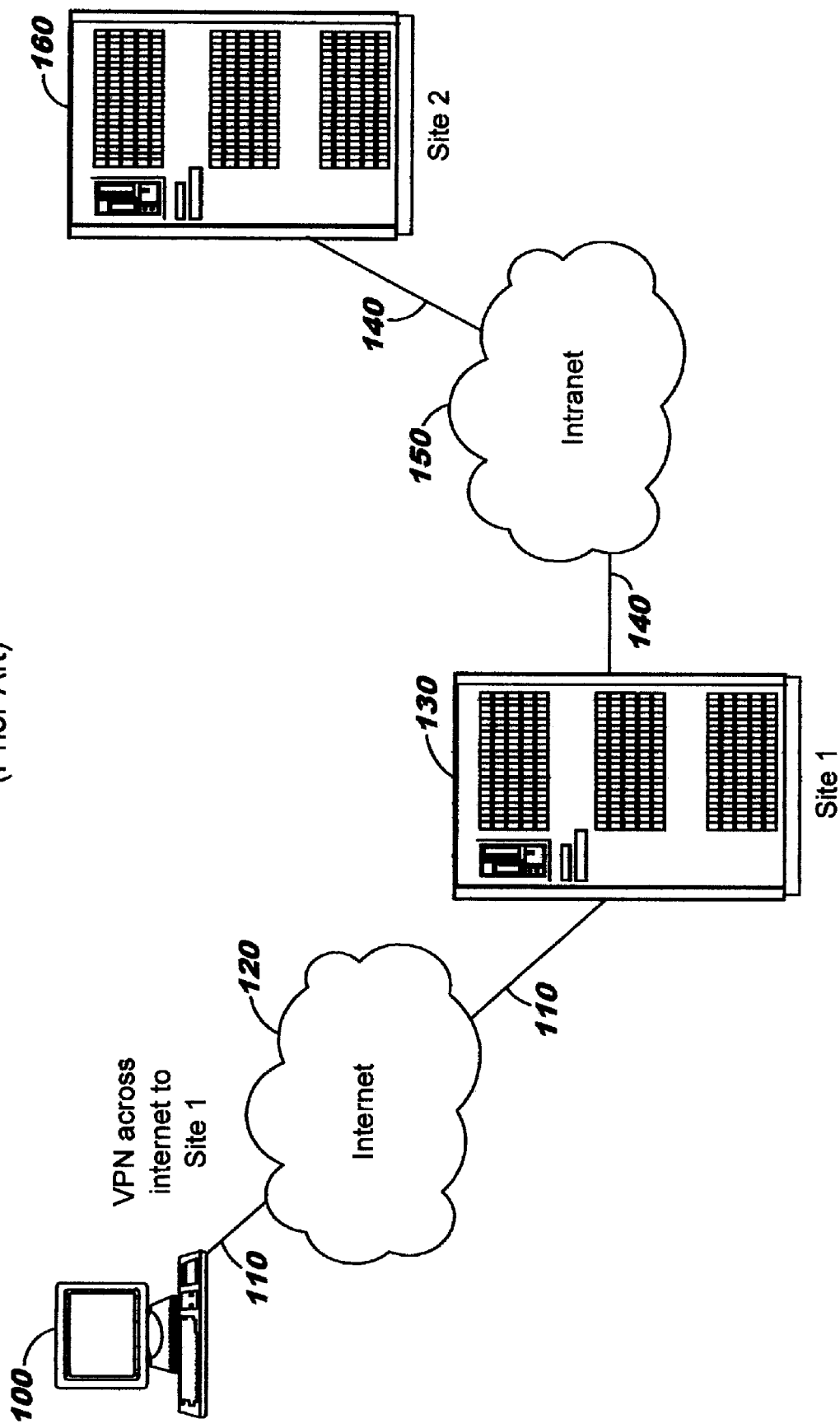
FIG. 1 provides a high-level illustration of components in a VPN scenario according to the prior art.

Transmitting data through an enterprise network can have a relatively high associated cost. As network traffic increases, the enterprise may need to deploy additional servers, routers, firewalls, and so forth, so that the increased network traffic correlates to increased network infrastructure cost to the enterprise. By contrast, transmitting data over a public network such as the Internet generally has little to no impact on the cost of the enterprise computing environment, and increasing the volume of traffic on the public network generally does not result in higher infrastructure cost to the enterprise. Accordingly, it is desirable to offload network traffic from an enterprise network to a public network as disclosed herein.

Embodiments of the present invention are directed toward dynamically selecting an endpoint for a network tunnel (which may also be referred to as a security tunnel) into an enterprise computing infrastructure. The selection of the tunnel endpoint is directed toward reducing transmission costs and/or other network infrastructure costs (referred to herein generally as "costs" for ease of reference) within the enterprise by leveraging a tunnel through the public network and transmitting data on that tunnel that might alternatively be transmitted (at higher cost) using the enterprise network.

As noted earlier, the connection between a client application and a boundary device into an enterprise computing infrastructure is commonly referred to as a "tunnel" or "VPN tunnel", and the boundary device and its tunneling application provide functionality that may be referred to as a "tunnel endpoint", "VPN server", or "VPN gateway". This VPN gateway also provides an intranet connection for forwarding traffic received from the client application, on the tunnel, through the enterprise network to a destination host on which the traffic's target application is executable. Similarly, the VPN gateway forwards traffic received from the destination host, over the enterprise network on the intranet connection, to the client application using the tunnel.

A "least-cost routing", or "LCR", approach is used in preferred embodiments to select a VPN gateway as a tunnel endpoint when multiple endpoints are available. For a particular destination host, cost metrics are provided for reaching that destination host from a plurality of VPN gateways (unless the destination host is reachable only through a single VPN gateway, in which case cost metrics may optionally be provided with regard to that single gateway). Factors used in computing the cost metrics comprise, by way of illustration but not of limitation, proximity of the VPN gateway to the destination host; stability or redundancy of network resources for this VPN gateway; monetary costs of transmitting data over a path between the VPN gateway and destination host; congestion on that path; hop count for that path; and/or latency or transmit time for data on that path. It may happen, in some cases, that additional or different factors are used.

In the prior art, a VPN endpoint used by a particular client device generally comprises the VPN server in closest proximity to the client device, where this VPN server is typically selected by a user of the client device upon establishing a VPN account (or is statically assigned to the user's client device by an enterprise). This selection is thereby configured into the VPN client, and does not change due to the client device moving to a different location or based upon which application the user accesses through the VPN tunnel. Refer to FIG. 1, which provides a high-level illustration of components in a VPN scenario according to the prior art. As shown therein, a client device 100 wants to access an application, and this application executes on a particular destination host 160. In this scenario, the client device establishes a VPN tunnel 110 through the public Internet 120 to a VPN gateway 130. VPN gateway 130 establishes a network connection 140 through the enterprise intranet 150 to the destination host 160. Enterprise intranet 150 may be configured as a Wide-Area Network ("WAN").

Suppose, for example, that the client device 100 is located in California, the VPN gateway 130 is located in Colorado, and the destination host 160 is located in New York. The enterprise is therefore responsible for providing computing resources that support the transmissions between the VPN gateway 130 in Colorado and the destination host 160 in New York (i.e., the underlying intranet computing resources).

FIG. 1 is illustrative of a client device tunneling into an enterprise using a VPN gateway at one enterprise location and crossing the enterprise intranet from that VPN gateway to reach another enterprise location. While the approach shown in FIG. 1 is functionally sufficient, it may happen that a lower-cost solution for the enterprise can be achieved by offloading data from enterprise intranet 150 to the public Internet 120 using techniques disclosed herein. For example, it may happen that the destination host is co-located with a VPN gateway. Or, it may happen that a VPN gateway is located in closer proximity to the destination host than the gateway selected as the tunnel endpoint according to the prior art approach illustrated in FIG. 1. Accordingly, techniques disclosed herein may be used to select a VPN gateway that provides the enterprise with a lower-cost route to the destination host—even though this selected VPN gateway may, in some cases, be located a considerable distance from the client device—as will now be described.

Transmission rates for data traversing the Internet through a VPN tunnel for individual VPN users generally do not vary based on where the VPN gateway is located in relation to the user's client device. Accordingly, minimizing the distance between the VPN client and the VPN gateway, as is done in prior art scenarios, achieves little cost benefit yet—in some circumstances—may increase the cost to the enterprise in which the application is hosted by increasing the enterprise computing resources used for carrying the traffic through the enterprise intranet to the destination host.

Figure 2:
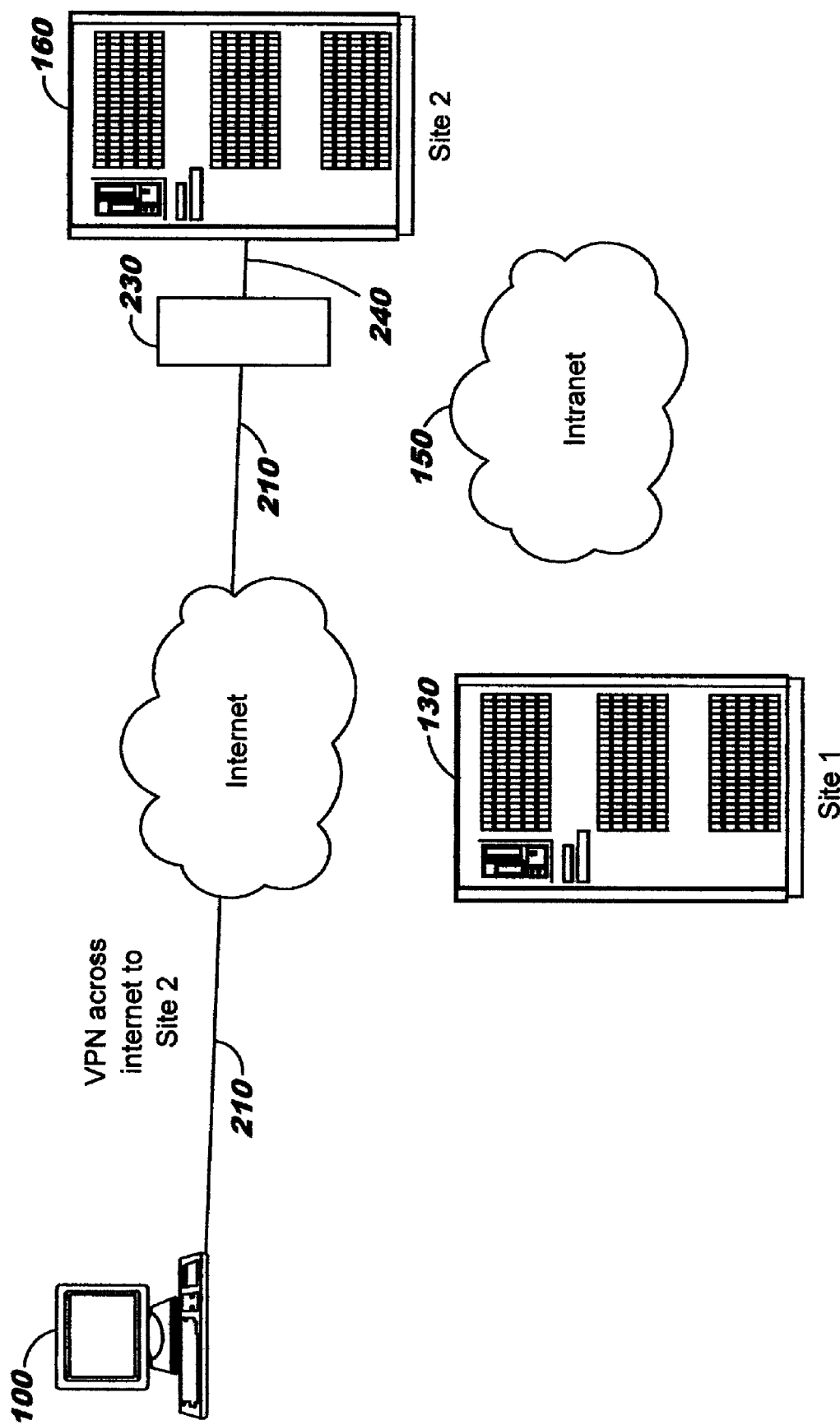
FIG. 2 illustrates a high-level view of components in a VPN scenario using one embodiment of the present invention.

FIG. 2 illustrates a high-level view of components in a VPN scenario using one embodiment of the present invention. This approach presumes that more than one VPN gateway is available for reaching the destination host 160 from client device 100. Suppose, for example, that another VPN gateway 230 is physically located in New York—or, it may happen that the VPN gateway functionality executes in the same device as destination host 160. An embodiment of the present invention may therefore determine that the enterprise cost is lower by using VPN gateway 230 for client device 100 to enter the enterprise computing infrastructure, as contrasted to entering the enterprise computing infrastructure at VPN gateway 130. Accordingly, client device 100 establishes a VPN tunnel 210 to VPN gateway 230, where this VPN tunnel 210 uses more public network resources than VPN tunnel 110 of FIG. 1. To complete the path between client device 100 and destination host 160, VPN gateway 230 establishes a network connection 240 through the enterprise intranet (not illustrated in FIG. 2) to the destination host 160. Notably, this network connection 240 uses fewer enterprise computing resources than network connection 140 of FIG. 1. (And in cases where the VPN gateway 230 is co-located in the same device as destination host 160, network connection 240 is not required, resulting in even lower cost for enterprise computing resources.)

Using numerical values assigned merely for illustration, suppose the cost of transmitting a data packet across tunnel 110 in the scenario of FIG. 1 is 5 units of some measure and the cost of transmitting this data packet across network connection 140 is 10 units; by contrast, suppose the costs for the scenario in FIG. 2 are 8 units for transmitting the data packet across tunnel 210 and 1 unit for network connection 240. Cost to the enterprise is therefore reduced from 10 units when using the prior art approach in FIG. 1 to 1 unit when using the approach in FIG. 2.

Figure 3:
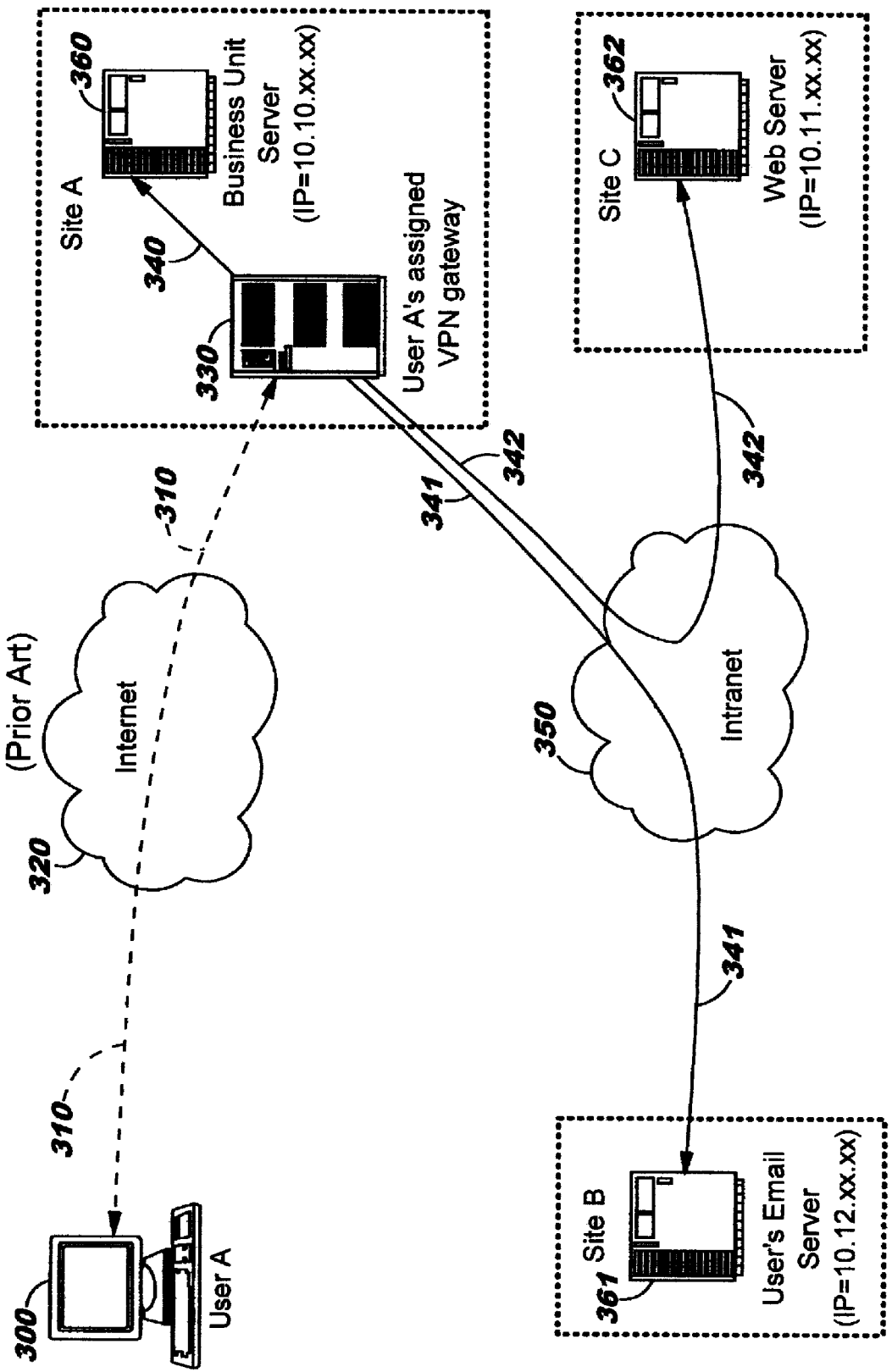
FIG. 3 depicts a prior art VPN scenario where a client device establishes a VPN tunnel through the public Internet to a VPN gateway.
Figure 4:
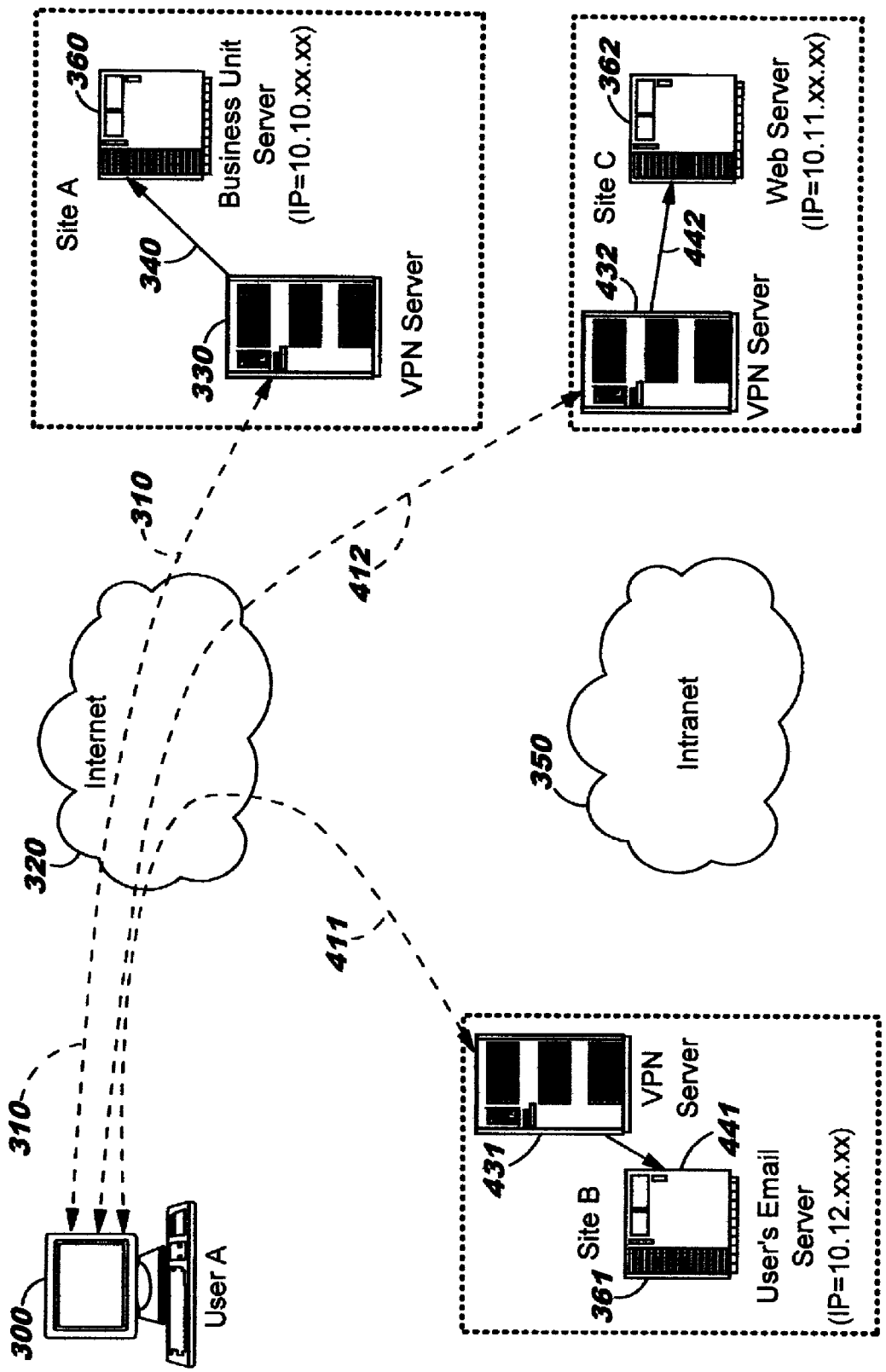
FIG. 4 illustrates a VPN client according to an embodiment of the present invention, where this VPN client establishes multiple VPN tunnels, each having a different VPN gateway as its tunnel endpoint.

FIGS. 3 and 4 provide another example to illustrate a further aspect of an embodiment of the present invention. FIG. 3 depicts a prior art VPN scenario where a client device 300 establishes a VPN tunnel 310 through the public Internet 320 to a VPN gateway 330 at a physical location referred to herein as "Site A" within a particular enterprise. VPN gateway 330 may, in some cases, be a good choice for client device 300 to enter the enterprise computing infrastructure—for example, if the user of client device 300 wishes to access a business application executing at destination host 360 at Site A, where destination host 360 is either co-located with VPN gateway 330 or is accessible from VPN gateway using a relatively low-cost intranet connection 340.

However, suppose the user of client device 300 also wishes to connect to an email application and a web server application, where the email application is hosted at a destination host 361 and the web server application is hosted at a destination host 362, and each of these destination hosts is physically located in a different geographical location than Site A. FIG. 3 represents these other locations as "Site B", providing the email application at destination host 361, and "Site C", providing the web server application at destination host 362. As noted above, a prior art VPN client establishes a single VPN tunnel to a VPN gateway that is identified to the VPN client using (static) configuration data. Accordingly, the VPN tunnel ends at VPN gateway 330, and VPN gateway 330 establishes a connection 341 through the enterprise intranet 350 for transmitting email traffic for client device 300 and a connection 342 through enterprise intranet 350 for transmitting web server application traffic for client device 300. Traffic destined for the email server at destination host 361 and the web server application at destination host 362 then traverses these intranet connections 341 and 342, respectively.

By contrast to the scenario in FIG. 3, techniques disclosed herein may be used to reduce enterprise costs whereby a VPN client establishes multiple VPN tunnels for simultaneous packet routing as illustrated in FIG. 4, each VPN tunnel having a different VPN gateway as its tunnel endpoint and each VPN gateway providing a separate entry point into the enterprise computing infrastructure. In preferred embodiments, selection of the VPN gateways is based on a destination filter. A destination filter may comprise (by way of illustration but not of limitation) one or more of the destination host address (which may be specified as an Internet Protocol, or "IP", address), a source port number, a destination port number, and a destination subnet, as will now be described.

In the example shown in FIG. 4, the tunnel 310 to VPN gateway 330 is again used for traffic between client device 300 and the business application executing at destination host 360. Using techniques disclosed herein, client device 300 may detect that the preferred enterprise entry point for email traffic is a different VPN gateway 431 which is located at Site B along with this user's email server at destination host 361 and that the preferred entry point for web server application traffic is yet another VPN gateway 432 which is located at Site C along with the web server application at destination host 362. In this example, because each of the Sites A, B, and C has a VPN gateway, traffic over the enterprise intranet may be greatly reduced (as compared to FIG. 3) and may even be eliminated (i.e., if the VPN gateway and destination host are co-located in the same device).

According to one embodiment of the present invention, a VPN client at a client device uses a locally-accessible table or similar data structure (referred to herein as a table for ease of reference) that provides LCR information for detecting which VPN gateway should be selected for reaching a particular destination host. This table may be provided to the VPN client in advance—e.g., during a set-up or initialization phase of the VPN client; or, an embodiment of the present invention may be adapted for providing the table out-of-band with respect to the VPN tunnel establishment. As one alternative to providing the table in advance, it may be provided to the VPN client when the VPN client contacts a VPN server for establishing a VPN tunnel. Or, rather than providing the table to the VPN client, the table may be stored in one or more centralized locations accessible to multiple VPN clients, and the VPN clients may receive an address of the table or a pointer to the table. As yet another alternative, a service or function may be provided whereby a VPN client can issue a request for cost metrics as needed. A sample version of the least-cost routing table that may be used in preferred embodiments is depicted (by way of illustration but not of limitation) in table 500, and will now be described.

As shown in FIG. 5, table 500 preferably comprises a column 501 for identifying particular destination filters and one or more columns for specifying routing cost metrics associated with routing from selectable VPN gateways to a destination matching the specified filter. In this example, columns 502, 503, 504 are provided for specifying cost metrics for each of 3 different selectable VPN gateways. These VPN gateways are identified in table 500, for illustrative purposes, as having IP addresses "9.9.8.8", "8.8.7.7", and "7.7.6.6", respectively.

Table 500 comprises, in this example, a row 510, 511, 512, 513 for each of 4 different destination filters. As stated earlier, each destination filter may be specified (by way of illustration but not of limitation) using at least one of a destination host IP address, a source port number, a destination port number, and a destination subnet, as noted earlier. In the example of FIG. 5, the filters identify destination hosts using their associated Internet Protocol ("IP") address and an optional port number. Row 510, for example, pertains to a destination filter for a destination host having IP address "1.2.3.4" and port number 24. As is well known in the art, port number 24 is one of a plurality of so-called "well-known port numbers" and represents an email application. Accordingly, a VPN client consulting table 500 to locate a VPN gateway for reaching an email application on the destination host having IP address 1.2.3.4 can use the information in row 510. Row 511 pertains to a destination filter for a destination host having IP address "2.3.4.5", without reference to a particular port number. Accordingly, in this example, row 510 can be used when selecting a VPN gateway for all traffic destined for the destination host having IP address 2.3.4.5. Rows 512 and 513 both pertain to destination filters for a destination host having IP address "3.4.5.6", with row 512 being specific to FTP ("File Transfer Protocol") traffic destined for that host, as indicated by the FTP well-known port number of 21, and row 513 being specific to HTTP ("Hypertext Transfer Protocol") traffic destined for that host, as indicated by the HTTP well-known port number of 80. Optionally, entries in column 501 may be specified using an IP address with a subnet mask (having a form such as "255.255.240.0", for example) or by otherwise specifying an address range. (Techniques for using a subnet mask and/or specifying an address range are well known in the art, and a detailed description thereof is not deemed necessary herein.)

In sample row 510, cost metrics of 1, 2, and 3 are specified for each of the selectable VPN gateways 502, 503, 504. These metrics might be indicative of an increasing cost corresponding to greater lengths of traversing the enterprise intranet. For example, if destination host 1.2.3.4 is located in New York, VPN gateway 502 might also be located in New York while VPN gateway 503 might be located in Chicago and VPN gateway 503 might be located in Los Angeles. The metrics in row 510 therefore favor connecting to this particular destination host 1.2.3.4 through VPN gateway 502 when using techniques disclosed herein.

Sample row 511 provides identical cost metrics for each of the 3 selectable VPN gateways 502, 503, 504. This may indicate, for example, that destination host 2.3.4.5 is not physically located near to any of the VPN gateways, and that any cost difference among them is considered to be insignificant. Similarly, the identical cost metrics in sample row 513 may indicate that HTTP traffic destined for destination host 3.4.5.6 can be routed to any of the 3 VPN gateways without a significant difference in cost. Sample row 512 has cost metrics of 1, 3, and 3, indicating that VPN gateway 502 is highly preferred over VPN gateways 503, 504 for transmitting FTP traffic to destination host 3.4.5.6, perhaps (by way of example) because VPN gateway 502 has higher throughput capacity than VPN gateways 503, 504.

An actual least-cost routing table used by an embodiment of the present invention may have many more rows and/or many more columns than the simple example table 500 provided in FIG. 5. And, while sample table 500 uses integer values between 1 and 3 for cost metrics, this is by way of illustration but not of limitation. Alternatives include using non-integer values, integer values having a greater range, and non-numeric values (which may include symbols or words such as "best", "good", "preferred", "avoid", and so forth). Furthermore, an embodiment of the present invention may provide for an LCR table (or mapping; see the discussion of FIG. 6) that specifies more than one value for a table entry pertaining to a particular destination filter and a particular VPN gateway, where this embodiment is adapted for using these values as input to an algorithm that is usable for selecting a VPN gateway.

Entries in table 500 may be created dynamically by a VPN gateway (or by a function/service provided for that purpose); as one alternative, entries in table 500 may be statically configured therein as representing "known" entities. VPN gateways may optionally self-populate cost metrics pertaining to a particular destination filter by periodically examining LCR data stored (for example) in a centralized location; upon finding that the information for a particular destination filter has no cost metric for the examining VPN gateway, this VPN gateway preferably adds its cost metric to that information. In one optional client-side approach for gathering LCR data, a VPN client may obtain LCR information from a particular client-side application that is unrelated to VPN processing or from a client-side data structure that is not provided for VPN processing.

In preferred embodiments, because the cost metrics pertain to routing costs within the enterprise intranet, the cost metrics in table 500 do not vary with the location of the VPN client. An identical table may therefore be provided to all VPN clients, if desired for an embodiment of the present invention. Notably, the source address of the client device does not need to be fixed, known, or trusted by the VPN gateways when using embodiments of the present invention. In some enterprises, a particular application may be replicated (for example, for load-balancing or other performance objectives). Because each replicated copy of the application has a distinct IP address and the least-cost routing table specifies a preferred VPN gateway for accessing a destination IP address, the replication will be transparent to the VPN client accessing the least-cost routing table (that is, the VPN client may be concerned with a destination host at a particular destination address, and can find a corresponding VPN gateway without regard to whether the same application is also available at other destination IP addresses).

In one approach, the least-cost routing table is created by a function or service leveraged by the VPN clients, and a completed table such as table 500 is distributed to such VPN clients. In another approach, VPN clients may receive cost metric information from individual VPN gateways and may consolidate this information into such table.

It may happen, in some computing environments, that the factors used for computing the cost metrics are relatively stable. In that case, updates to the least-cost routing table used by the VPN clients may be needed only occasionally. In other computing environments, the factors used for computing the cost metrics may change frequently, including on a day-to-day basis or even more often. Updates to the least-cost routing table may be needed relatively frequently in such cases. Accordingly, an embodiment of the present invention may update the least-cost routing tables periodically, and such updates may be driven (for example) by occurrence of one or more events or upon expiration of a timer. Examples of events that may trigger an update of the LCR table data include (by way of illustration only) detecting a configuration change in the enterprise intranet or detecting that a particular VPN gateway is slowing down due to congestion. Configuration data may be used to determine whether table updates are triggered by events and/or by timers, and particular conditions under which such updates should be performed.

The least-cost routing table described with reference to FIG. 5 is designed as a table usable by all VPN clients, where that table contains identical cost metrics without regard to the client location and from which each VPN client can dynamically select a VPN gateway as the tunnel endpoint that matches a particular destination filter by evaluating cost metrics associated therewith. As one alternative to using this type of table, another embodiment of the present invention provides a VPN client with a mapping (which may be embodied in a table or similar data structure) that directly specifies which VPN gateway should be selected by the VPN client for communicating with a destination host identified by a particular destination filter. A sample mapping is shown, by way of example, in table 600 of FIG. 6, as will now be described.

In mapping table 600, the least-cost routing metrics are reflected by presenting the VPN client with the preferred VPN gateway 602 to use for communicating with a destination host identified by a particular destination filter 601, according to those metrics. FIG. 6 is intended to represent equivalent cost metrics as were used in FIG. 5, and accordingly, row 610 indicates that the preferred VPN gateway for communicating with port 24 on destination host 1.2.3.4 is the VPN gateway having IP address 9.9.8.8 (which conclusion is also reached by analyzing the cost metrics in row 510 of table 500). Similarly, this VPN gateway 9.9.8.8 is indicated in row 612 as the preferred VPN gateway for communicating with port 21 on destination host 3.4.5.6 (see also row 512 of FIG. 5). Because the cost metrics among VPN gateways 9.9.8.8, 8.8.7.7, and 7.7.6.6 are identical for communicating with destination host 2.3.4.5 (see row 511 of table 500) and with port 80 on destination host 3.4.5.6 (see row 513 of table 500), rows 611 and 613 list each of these VPN gateways as a preferred gateway. When using this mapping approach, a VPN client may use the destination filter as an index into mapping 600 to thereby retrieve an identification of the VPN gateway to use for a particular tunnel endpoint.

Other embodiments of the present invention may determine the VPN gateway to use for a particular tunnel endpoint in other manners without deviating from the scope of the present invention. As one example, the VPN client in one alternative embodiment does not store or access an already-created table or mapping, but instead dynamically selects a VPN gateway by polling a function or service that determines such information on behalf of a particular client with regard to a particular destination filter. This function/service might use an algorithm that determines which VPN gateway is physically closest to a destination host using pings, for example, to thereby minimize the length of the network path between the VPN gateway and the destination host. This approach may be beneficial, for example, in environments where the configuration of the intranet is highly dynamic and that might therefore quickly render LCR data stored in client-side tables or mappings obsolete. Other VPN gateway selection techniques might be used alternatively. As one example of such other selection technique, the function/service may maintain dynamically-changeable information about costs and performance data for resources in the intranet, and may use this information to select a preferred VPN gateway for communicating with a destination host described by a particular destination filter in response to a VPN client request. Such function/service might be adapted (by way of example) for always selecting a VPN gateway for which a network path between that gateway and the destination host has a lowest monetary cost, unless that particular path has a latency cost metric exceeding some threshold value, in which case the function/service selects the VPN gateway associated with the next-lowest cost network path. Many other algorithms might be used alternatively without deviating from the scope of the present invention.

As yet another example of an alternative to the VPN client using a table or mapping, an embodiment of the present invention may provide a redirect-type approach whereby a VPN gateway informs a VPN client attempting to use that VPN gateway as a tunnel endpoint that a different VPN gateway is preferable. This notification to the VPN client may be sent during an initialization protocol that attempts to establish the VPN tunnel. In this case, the VPN client preferably contacts the different VPN gateway and establishes the VPN tunnel with that VPN gateway prior to using the VPN tunnel for transmitting any data traffic. Or, instead of receiving the notification during an initialization protocol, the notification may be received after a VPN tunnel is already established and in use. For example, it may happen that a VPN tunnel is carrying data traffic for a session with a particular application and some type of change occurs in the intranet, such as outage of network links or other resources, causing the presently-used VPN gateway to no longer be preferred. In this case, a redirect notification may be sent to the VPN client, notifying it that the VPN tunnel will be migrated to a different VPN gateway. In either of these redirect scenarios, the VPN client may be adapted for updating its locally-accessible LCR table or mapping to reflect the newly-preferred VPN gateway for the destination filter (and the VPN client preferably persists its stored LCR data as a safeguard against losing data during a VPN client restart).

Referring now to FIG. 7, a data structure format 700 is depicted therein to illustrate one manner of representing the information used for creating LCR table 500 or mapping 600. This data structure 700 corresponds to LCR data for a particular destination filter and VPN gateway through which destination host(s) matching that destination filter can be reached. With reference to the sample data in FIG. 5, for example, row 510 may be created from 3 data records that each have format 700, where each such record corresponds to a path between port 24 at destination host 1.2.3.4 and a different one of the VPN gateways 502, 503, 504.

Data element 701 of FIG. 7 specifies the destination filter to which this data record pertains, and data element 702 specifies information pertaining to the VPN gateway. Data element 702 preferably comprises an IP address of a particular VPN gateway, and may also comprise further protocol-specific information required for connecting to the VPN gateway (details of which are not deemed necessary to an understanding of the present invention).

Data element 703 stores a cost metric representing a cost of using this VPN gateway 702 as a tunnel endpoint to destination host 701. As one alternative, data element 703 may be replaced by multiple data elements, each providing a value for one of a plurality of factors used in computing the cost metric. For example, a value might be provided for a hop count and another value might be provided for a monetary cost, while yet another value might be provided for a latency or round-trip time measurement. Values of these multiple data elements, when applicable, may then be provided as input to an algorithm that is adapted for combining the values to generate a single cost metric (where that single cost metric then corresponds to one of the individual table entries for a particular row in table 500).

Optionally, a time stamp 704 and/or expiration date 705 may be provided in data records having format 700. The time stamp 704 preferably indicates the date/time when the particular data record was created, and may optionally be used for purging stale data records. The expiration date 705 preferably specifies an expiration date/time at which this record is to be purged or otherwise considered invalid.

Data element 706 is a "push to client" flag that may be used by at least some embodiments of the present invention. When set to "true" or "on", this flag indicates that this data record should be pushed to VPN clients during the client's VPN session initialization phase (as will be discussed in more detail below). Alternatively, if the flag is set to "false" or "off", this indicates that the values in this data record are not automatically pushed to the client. Instead, the client may obtain the values by issuing an explicit probe request (also discussed in more detail below).

Figures 9, 10, 11:
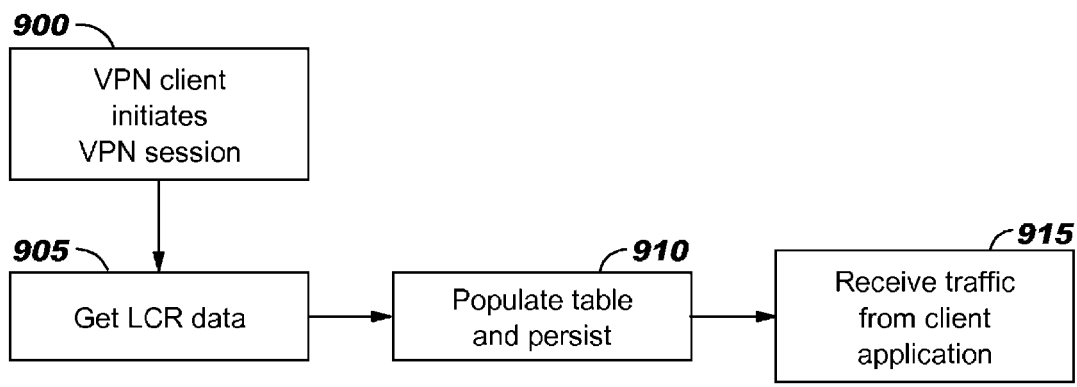
FIG. 10 illustrates one approach for constructing a message with which the LCR data for an LCR table or LCR mapping may be transmitted to a VPN client, and FIG. 11 provides a sample value corresponding to this message.

FIG. 8 provides a flowchart depicting logic which may be used at a VPN client, according to one embodiment of the present invention. Upon receiving a stimulus from an application executing at this client device (Block 800), such as receiving an IP datagram carrying an application protocol data unit ("PDU"), referred to equivalently herein as a "packet", the VPN client functionality extracts the destination IP address from this packet (Block 805). Referring now to FIG. 9, logic is shown that expands upon Block 800 for one embodiment of the present invention, as will now be described.

The logic depicted in FIG. 9 may be used in a scenario where a VPN client establishes VPN tunnels upon demand, and has a default VPN gateway with which to communicate at VPN session establishment time. This default VPN gateway may be, in one approach, the primary VPN tunnel endpoint for this VPN client. "Primary VPN tunnel endpoint", as used herein, refers to using a predetermined VPN gateway that is preferably identified in configuration data of the VPN client (or, as one alternative, a user-selected VPN gateway that is identified by prompting the user) and "primary VPN tunnel" refers to a VPN tunnel having this VPN gateway as its endpoint. Notably, a VPN gateway does not need to know a VPN client's address in advance when using an embodiment of the present invention.

Block 900 indicates that the VPN client initiates a VPN session with the primary VPN tunnel endpoint. At Block 905, the VPN client preferably issues a request to the primary VPN tunnel endpoint for currently-applicable LCR data; as one alternative, the primary VPN tunnel endpoint may automatically send this information to the VPN client upon receiving the initial VPN session establishment request issued at Block 900. The primary VPN tunnel endpoint preferably checks stored data records having format 700 of FIG. 7 to determine which of those data records have their push-to-client flag 706 set and transmits the corresponding information to the VPN client.

FIG. 10 illustrates one approach for constructing a message with which the LCR data for table 500 or mapping 600 may be transmitted to a VPN client. This message may be contained within the control protocol descriptors for VPN session negotiation. If the Layer 2 Tunneling Protocol ("L2TP") or Point-to-Point Protocol ("PPP") is used, for example, then the LCR table data may be encoded and wrappered with link layer control protocol headers (referred to in message format 1000 as "LCP") and control information (referred to in message format 1000 as "CI"). Message format 1000 depicts transmitting a sequence of "table_entry" values. Each such value may be structured according to the format shown in FIG. 7. A sample table_entry value is shown in FIG. 11, for illustrative purposes. The LCR value of "1" depicted therein (see the third bracketed entry) corresponds generally to the first cell in row 510 of FIG. 5 (and a VPN port number is shown in combination with IP address of 9.9.8.8 for identifying the VPN gateway in this example, where this VPN port number is shown for illustrative purposes as "34567").

Referring again to FIG. 9, upon receiving a message having format 1000 at the VPN client, the client populates its locally-accessible table (or mapping, as applicable) and persists that data, at least temporarily (Block 910). Preferably, the table/mapping is stored using a high-performance medium of some type that will enable fast lookups and retrievals. As one alternative to having the client populate a table, the message used for transmitting LCR data to a VPN client may be adapted for transmitting an already-created table 500 or mapping 600 (where suitable delimiters or other techniques may be used to indicate the boundaries of each separate entry therein). In this case, Block 910 of FIG. 9 preferably comprises persisting (at least temporarily) the table or mapping for use by the VPN client.

Block 915 indicates that the VPN client receives traffic from the client application, where this traffic is to be routed using the VPN tunnel. FIG. 8, the remainder of which is discussed below, depicts logic that may be used in this processing.

It should be noted that the order of operations represented in FIG. 9 may be altered without deviating from the scope of the present invention. For example, the traffic discussed with reference to Block 915 may be received prior to, and as a triggering event for, the initiation of the VPN session at Block 900. Furthermore, the LCR data processing discussed with reference to Blocks 905 and 910 may occur out-of-band of the VPN session establishment protocol (and may therefore serve to preload the LCR table/mapping that will be subsequently consulted when the VPN session establishment protocol operates). An embodiment of the present invention may be adapted for using an already-loaded LCR table/mapping at the VPN client, where this already-loaded table/mapping may have been persisted from an earlier VPN session. When using an already-loaded table, updates to the LCR data stored therein may be processed on an ad hoc or on-demand basis. (Refer also to the discussion of Blocks 810, 825, and 835 of FIG. 8, below).

Returning now to the discussion of FIG. 8, after the VPN client extracts the destination host address information from the application data packet at Block 805, Block 815 then tests whether there is a "hit" in the LCR table—that is, whether there is an entry therein for a destination filter matching the extracted destination IP address. (It will be obvious to one of skill in the art, based on the teachings herein, how the functionality of FIG. 8 may be adapted for using an IP port number in addition to or instead of using an IP address, and for using an IP subnet mask when applicable.)

If the test in Block 815 has a positive result, indicating that a matching LCR table entry is present for this destination host, then processing continues at Block 830 where a VPN gateway is selected from that table entry and a VPN tunnel is assigned using this selected VPN gateway. In preferred embodiments, the selection comprises selecting the VPN gateway having the lowest cost metric from the table row corresponding to the destination filter. (Or, if a mapping of the type illustrated in FIG. 6 is used instead of a table as illustrated by FIG. 5, then Block 830 obtains a preselected VPN gateway from this mapping when Block 815 determines that a matching filter entry exists in the mapping.)

Block 840 tests whether a VPN tunnel is already established to the selected VPN gateway. If so, then processing continues at Block 860 where the outbound PDU may be transformed based on the tunnel assignment performed at Block 830. This transformation preferably comprises setting a source address value in the outbound PDU that will ensure routing of corresponding response messages to the selected VPN gateway. Block 865 then transmits the PDU to the VPN server using the VPN tunnel.

Referring again to the test in Block 840, when this test has a negative result (indicating that a VPN tunnel is not yet established to the selected VPN gateway), processing continues at Block 845 which attempts to establish the tunnel (preferably using a prior art tunnel establishment procedure). Block 850 tests whether this tunnel establishment completed successfully. If so, then processing continues at Block 860 and otherwise, control transfers to Block 855. At Block 855, preferred embodiments assign the primary VPN tunnel for use in reaching the destination host.

Referring again to the test in Block 815, this test has a negative result when a matching destination filter is not found in the LCR table (or LCR mapping) for the destination host. In preferred embodiments, processing continues at Block 820 which attempts to obtain LCR data for the destination host by creating an LCR probe request message and sending that message to a VPN server (or, generally, to a function or service) that is adapted for responding thereto. As one option, an LCR probe may be sent simultaneously to all VPN gateways known to this VPN client. So as to not unduly delay the application while awaiting an LCR probe response, an embodiment of the present invention preferably routes the application packet over a tunnel to the primary VPN tunnel endpoint; see the discussion of Block 855, below. An LCR probe request might also be sent out by a VPN client after a VPN tunnel is already established and an application using that tunnel generates traffic for a destination host that is not reflected in a destination filter of the LCR data, and this LCR probe request and response are preferably handled as has been described.

As another option pertaining to LCR probes, an embodiment of the present invention may be adapted for ignoring LCR probe requests at a VPN gateway that chooses to use statically-configured LCR entries instead. When this option is implemented, preferred embodiments exchange messages at VPN session start-up time indicating that the VPN gateway will ignore or discard LCR probe requests; the VPN client may then suppress sending such probe requests to avoid generating useless traffic.

A sample message format that may be used for sending an LCR probe request from the VPN client is shown in FIG. 12. The LCR probe request may be wrappered with link layer control protocol headers and control instructions (in a similar manner to that discussed earlier with reference to FIG. 10). The body or payload of this LCR probe request message, as illustrated in FIG. 12, comprises a destination filter which is illustrated (in this example) as a destination address and a destination port number to identify the destination host for which the VPN client is requesting cost metric information. An LCR probe response message for returning the requested cost metric information to the VPN client is preferably formatted using message format 1000 in FIG. 10, where this LCR probe response comprises a single "table_entry" value (such as the sample value illustrated in FIG. 11).

After transmitting the LCR probe request message at Block 820, the embodiment depicted in FIG. 8 transfers control to Block 855 where the primary VPN tunnel is assigned for reaching the destination host, as discussed earlier. Assuming this primary VPN tunnel is already established, processing continues at Blocks 860 and 865, which have been described above.

Referring now to Block 810 of FIG. 8, a VPN client may receive an unsolicited redirect notification based upon LCR data. These redirect notifications have been discussed above, and may occur during the VPN session establishment phase or thereafter. Upon receiving an LCR redirect notification, or upon receiving an LCR probe response at Block 825, the VPN client updates its LCR table/mapping and persists that information (at least temporarily) at Block 835.

FIG. 13 illustrates a sample data structure format 1300 that may be used for redirect notifications that pertain to LCR data. As shown therein, an LCR redirect message preferably comprises a protocol identifier 1301, which may (by way of example) have a value of hexadecimal "C021" to indicate link control protocol data; a content identifier 1302 (identifying the message as an LCR redirect message); a length field 1303 that specifies the overall message length; a destination filter 1304 (which may comprise a destination host address, application port(s), subnet information, and so forth usable for matching data packets with this LCR table entry, as has been discussed); VPN tunnel information 1305 specifying information to assign (and optionally to establish) a VPN tunnel; a cost 1306 associated with using this VPN gateway to reach a destination host matching destination filter 1304 (and cost 1306 may optionally provide a plurality of individual cost metric values, as has been discussed with reference to FIG. 5); and a timestamp 1307 and expiration date 1308, which are preferably used in an analogous manner to that which has been described for elements 704 and 705 of FIG. 7.

Figure 14:
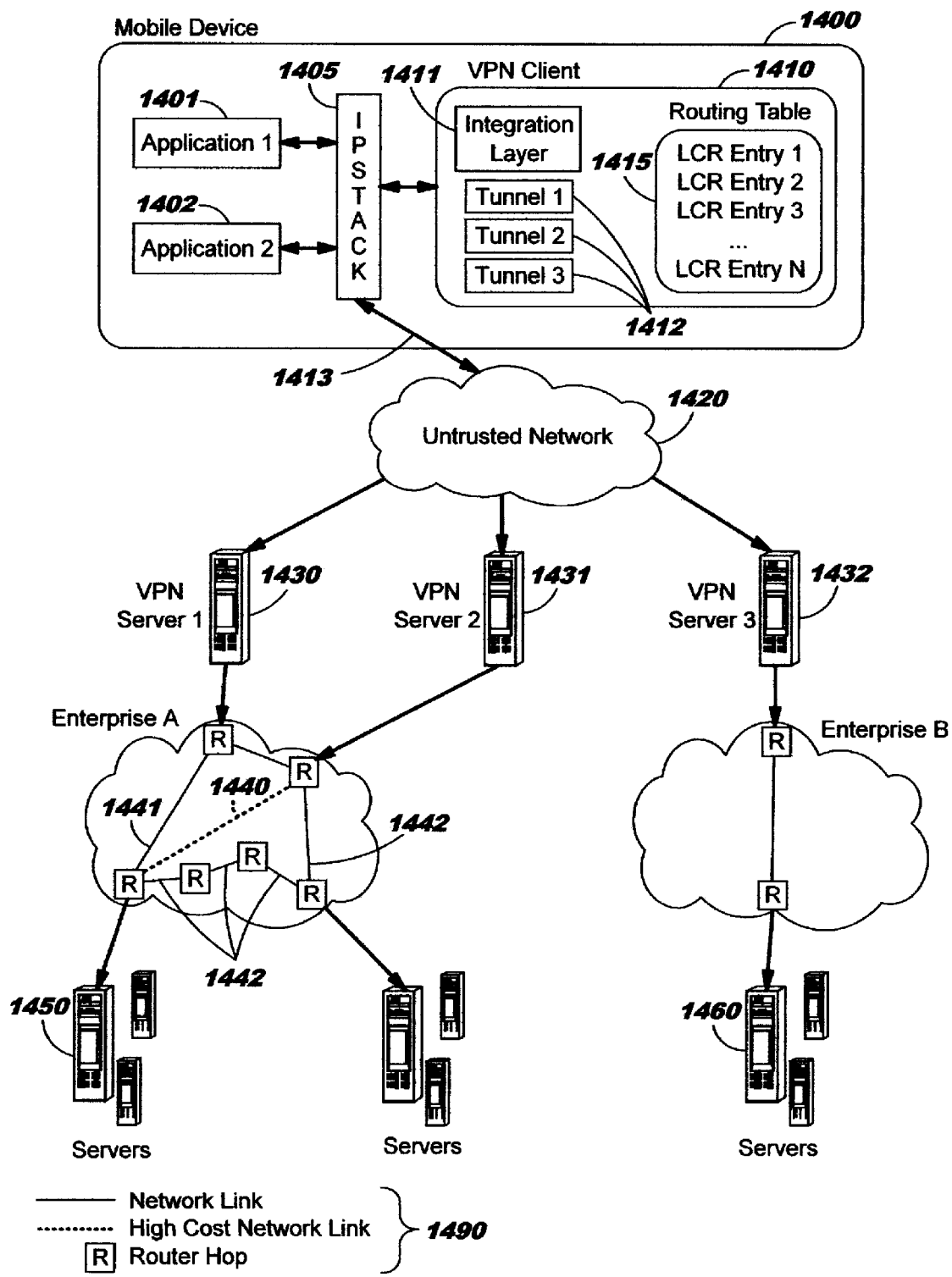
FIG. 14 illustrates components of an embodiment of the present invention in a scenario where a client device communicates with applications deployed at 2 different enterprises, and a VPN client executing at this client device communicates with these applications using VPN tunnels to each of the enterprises.

FIG. 14 illustrates components of an embodiment of the present invention in a scenario where client device 1400 communicates with applications deployed at 2 different enterprises, referred to in FIG. 14 as "Enterprise A" and "Enterprise B". Client-side application logic for these applications is shown at 1401, 1402 as executing within client device 1400. An IP stack 1405 within client device 1400 is leveraged for communicating with the untrusted network 1420. VPN client functionality 1410 also executes within client device 1400, and is depicted in FIG. 14 as comprising an integration layer 1411, a plurality of established VPN tunnels 1412, and an LCR routing table 1415 that comprises a plurality of LCR entries. In one embodiment, the integration layer 1411 of the VPN software is responsible for tying functional components together to determine the course of action to take on a particular PDU as it moves through the VPN logic. This may include (by way of illustration but not of limitation) filtering, data optimization, protocol optimization, protocol header modification, and tunnel assignment.

The intranets of Enterprise A and Enterprise B are depicted in FIG. 14 using network links that are terminated by routers, which are designated in the figure as "R". See legend 1490. A particular one of the network links 1440 at Enterprise A is depicted, in this example, as being a high-cost network link. Suppose that the server-side application server for "Application 1" 1401 is deployed in Enterprise A at server 1450. LCR data usable by VPN client 1410 preferably provides 2 table entries pertaining to the IP address of destination host (i.e., server) 1450, where these 2 table entries represent the cost of accessing destination host 1450 through VPN gateway 1430 and through VPN gateway 1431, respectively. The table entry associated with VPN gateway 1430 preferably corresponds to network link 1441. The table entry associated with VPN gateway 1431 may correspond to high-cost network link 1440, and may therefore contain a higher cost metric value than that of network link 1441. VPN client 1410 may dynamically compare VPN gateway 1430 to VPN gateway 1431 for connecting to destination host 1450 using one or more metrics. VPN gateway 1430 and VPN gateway 1431 may look equally attractive compared by their router hop count to the target server 1450, for example, in which case the client could select either path. As a further refinement, the client 1410 might consider the "high-cost" metric for network link 1441 in deciding which gateway to use. The high-cost metric might indicate, for example, that the enterprise pays usage-based charges for this link, while the other links might use flat-rate charges. An embodiment of the present invention may be configured such that some VPN clients never use a high-cost path, while other clients may be permitted to use such paths. Similarly, an embodiment of the present invention may allow for certain metrics, such as a high-cost path, to be used only by certain applications. As a further alternative, the table entry associated with VPN gateway 1431 and destination host 1450 might represent the multi-hop network link 1442. Whether that table entry indicates that route 1442 is a lower-cost route than route 1441 to destination host 1450 depends on the factors used in computing the respective cost metrics.

The application server for "Application 2" 1402 may be deployed in Enterprise B at server 1460. In that case, VPN client 1410 establishes a VPN tunnel to VPN gateway 1432, which provides an entry point into the intranet of Enterprise B.

In one optional aspect, the network through which a tunnel is provided (and in particular, the transport layer responsible for carrying tunnel traffic) is not limited to the public Internet or to a public network of any type, and techniques disclosed herein may be leverage with untrusted networks without regard to whether those networks are public or private. The tunneled network might be, for example, a private mobile radio network, a private enterprise network, an i2 (i.e., "next generation Internet") network, and so forth. It should also be noted that the particular network type in use may influence the cost metrics used by an embodiment of the present invention. For example, it may be desirable to route PDUs through a tunnel that exists over a private network for security reasons while other less-sensitive applications are routed over a tunnel through a public network. This could be, for example, in the form of multiple tunnels to the same VPN server (or to multiple VPN servers) but over different external networks and/or private enterprise networks.

Optionally, an embodiment of the present invention may allow for the IP address of the IP stack onto the untrusted network 1420 (see 1413 of FIG. 14) to change without disconnecting tunnels or sessions. Such changing of the client IP address may occur, for example, responsive to a client roaming between or inside networks.

As will be appreciated by one of skill in the art, embodiments of the present invention may be provided as (for example) methods, systems, and/or computer program products. The invention can take the form of an entirely hardware embodiment, an entirely software embodiment, or an embodiment containing both hardware and software elements. In a preferred embodiment, the invention is implemented in software, which includes (but is not limited to) firmware, resident software, microcode, etc. Furthermore, the present invention may take the form of a computer program product which is embodied on one or more computer-usable storage media (including, but not limited to, disk storage, CD-ROM, optical storage, and so forth) having computer-usable program code embodied therein, where this computer program product may be used by or in connection with a computer or any instruction execution system. For purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory ("RAM"), a read-only memory ("ROM"), a rigid magnetic disk, and an optical disk. Current examples of optical disks include compact disk read-only memory ("CD-ROM"), compact disk read/write ("CD-R/W"), and DVD.

Figure 15:
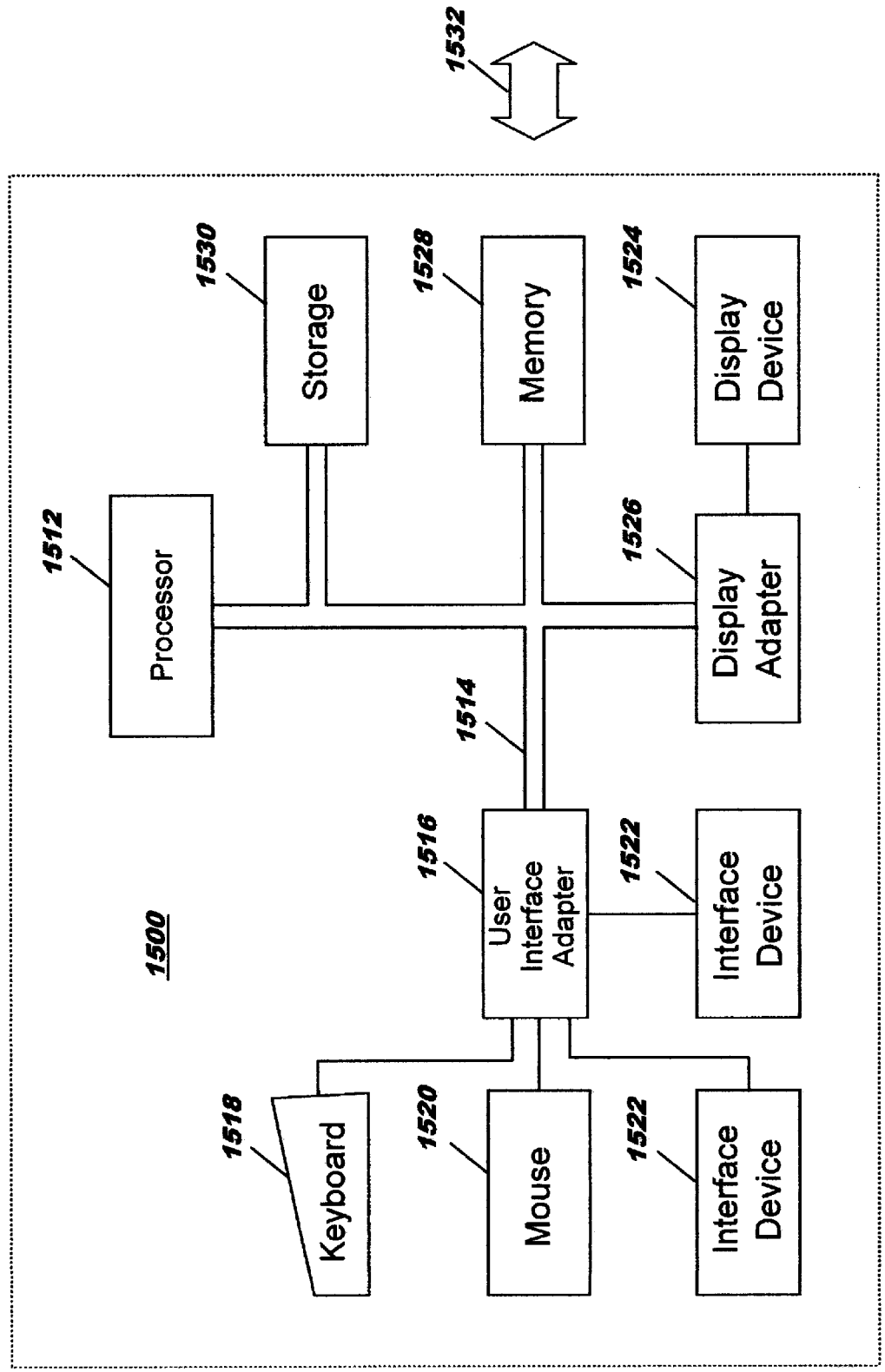
FIG. 15 depicts a data processing system suitable for storing and/or executing program code.

Referring now to FIG. 15, a data processing system 1500 suitable for storing and/or executing program code includes at least one processor 1512 coupled directly or indirectly to memory elements through a system bus 1514. The memory elements can include local memory 1528 employed during actual execution of the program code, bulk storage 1530, and cache memories (not shown) which provide temporary storage of at least some program code in order to reduce the number of times code must be retrieved from bulk storage during execution.

Input/output ("I/O") devices (including but not limited to keyboards 1518, displays 1524, pointing devices 1520, other interface devices 1522, etc.) can be coupled to the system either directly or through intervening I/O controllers or adapters (1516, 1526).

Network adapters may also be coupled to the system to enable the data processing system to become coupled to other data processing systems or remote printers or storage devices through intervening private or public networks (as shown generally at 1532). Modems, cable modem attachments, wireless adapters, and Ethernet cards are just a few of the currently-available types of network adapters.

As will be apparent from the disclosure presented herein, a data processing network environment which the present invention may be practiced may comprise a plurality of individual networks, such as one or more wireless networks and one or more wired networks. A plurality of wireless devices and/or a plurality of wired devices may communicate over these networks.

The wired and/or wireless networks may include various devices which are known to those of skill in the art, including mainframe computers or servers, and these devices may be preferably coupled by means of various communications links (and such communication links are also generally known to those of skill in the art).

The present invention has been described with reference to flow diagrams and/or block diagrams according to embodiments of the invention. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a general purpose computer, special purpose computer, embedded processor, or other programmable data processing apparatus to produce a machine, such that the instructions, which execute via the processor of the computer or other programmable data processing apparatus, create means for implementing the functions specified in the flow diagram flow or flows and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flow diagram flow or flows and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flow diagram flow or flows and/or block diagram block or blocks.

While embodiments of the present invention have been described, additional variations and modifications in those embodiments may occur to those skilled in the art once they learn of the basic inventive concepts. Therefore, it is intended that the appended claims shall be construed to include the described embodiments and all such variations and modifications as fall within the spirit and scope of the invention.

The invention claimed is:

1. A computer-implemented method of selecting a network tunnel endpoint to serve as a gateway through which a client located outside an enterprise network reaches a destination host located inside the enterprise network, comprising:
   dynamically selecting, for the client from among a plurality of selectable tunnel endpoints through which the destination host is reachable, a particular one of the selectable tunnel endpoints to serve as the gateway for tunneling into the enterprise network, wherein the particular one has a lowest cost for reaching the destination host, according to cost metric information associated with reaching the destination host from each of the selectable tunnel endpoints; and establishing the network tunnel from the client to the particular one of the selectable tunnel endpoints.

2. The method according to claim 1, wherein the network tunnel is a virtual private network ("VPN") tunnel.

3. The method according to claim 1, wherein the dynamically selecting is performed by the client, and the client then initiates the establishing of the network tunnel.

4. The method according to claim 3, wherein the cost metric information is specified in a data structure accessible to the client.

5. The method according to claim 1, wherein the cost metric information comprises at least one of: proximity of the selectable tunnel endpoints to the destination host; stability or redundancy of network resources associated with the selectable tunnel endpoints; monetary costs of transmitting data over a path between the selectable tunnel endpoints and the destination host; congestion on the path; hop count for the path; and transmit time for data on the path.

6. The method according to claim 1, wherein each of the selectable tunnel endpoints is identified using a destination filter, the destination filter for each of the selectable tunnel endpoints comprising at least one of: an identification of the destination host; a source port number associated with an application that will use the tunnel; a destination port number associated with the application; and a destination subnet.

7. The method according to claim 6, wherein the dynamically selecting further comprises:
dynamically issuing a probe for cost metric information for reaching the destination host when a comparison of the identification of the destination host to the destination filter for the selectable tunnel endpoints determines that no destination filter matches the identified destination host; and
performing the dynamically selecting using results received responsive to the dynamically-issued probe.

8. The method according to claim 6, wherein the dynamically selecting further comprises comparing an identification of the destination host to the destination filter for selected ones of the selectable tunnel endpoints until determining that the destination filter for the particular one of the selectable tunnel endpoints applies to the identified destination host.

9. The method according to claim 1, further comprising:
performing the dynamically selecting for each of a plurality of destination hosts located inside the enterprise network, thereby selecting at least two different ones of the selectable tunnel endpoints to serve as gateways for tunneling into the enterprise network from the client; and
performing the establishing, by the client, for each of the at least two different ones of the selectable tunnel endpoints, thereby enabling the client to communicate with each of the plurality of destination hosts using distinct network tunnels from the client to each of the at least two different ones.

10. The method according to claim 1, wherein the client is located in an untrusted network environment and the dynamically selecting occurs responsive to a notification sent to the client from an initial tunnel endpoint that serves as the gateway for tunneling into the enterprise network, wherein the notification directs the client to select a different tunnel endpoint as the gateway.

11. The method according to claim 1, wherein:
the dynamically selecting and the establishing are performed by the client, the client being located in an untrusted network environment; and
the cost metric information is distributed to the client upon detecting that the client is preparing to establish the network tunnel.

12. The method according to claim 1, wherein the network tunnel traverses an untrusted network.

13. The method according to claim 1, wherein the network tunnel traverses one of: a private mobile radio network; a private enterprise network; and an i2 network.

14. The method according to claim 1, wherein the cost metric information associated with reaching the destination host from at least one of the selectable tunnel endpoints is periodically revised.

15. The method according to claim 1, wherein:
the particular one of the selectable tunnel endpoints establishes a connection through the enterprise network to the destination host; and
communications between the client and the destination host use the established network tunnel and the established connection.

16. The method according to claim 1, wherein:
the destination host is co-located with the particular one of the selectable tunnel endpoints; and
communications between the client and the destination host use the established network tunnel.

* * * * *